United States Patent [19]
Okubo

[11] Patent Number: 6,059,413
[45] Date of Patent: May 9, 2000

[54] PROJECTION-TYPE DISPLAY DEVICE

[75] Inventor: Mitsuo Okubo, Tokyo, Japan

[73] Assignee: Mitsubishi Denki Kabushiki Kaisha, Tokyo, Japan

[21] Appl. No.: 09/163,427

[22] Filed: Sep. 30, 1998

[30] Foreign Application Priority Data

Feb. 27, 1998 [JP] Japan ................................. 10-047643

[51] Int. Cl.⁷ .................................................. G03B 21/22
[52] U.S. Cl. ............................................ 353/77; 353/119
[58] Field of Search .................................. 353/101, 100, 353/119, 79, 72, 71, 94, 70, 69, 46, 50, 77, 74; 348/836, 839, 745

[56] References Cited

U.S. PATENT DOCUMENTS

| | | | |
|---|---|---|---|
| 3,359,855 | 12/1967 | Webb | 353/94 |
| 4,676,615 | 6/1987 | Hillstrom et al. | 353/101 |
| 5,537,169 | 7/1996 | Park | 353/101 |
| 5,586,818 | 12/1996 | Lee | 353/101 |
| 5,618,094 | 4/1997 | Lee | 353/101 |
| 5,648,878 | 7/1997 | Park | 359/809 |
| 5,741,057 | 4/1998 | Goldberg et al. | 353/74 |
| 5,895,110 | 4/1999 | Okada et al. | 353/31 |

FOREIGN PATENT DOCUMENTS 8-32907 2/1996 Japan .
8-271978 10/1996 Japan .

*Primary Examiner*—William C. Dowling

[57] ABSTRACT

A projection-type display device of the present invention includes a projection unit for projecting an image to be displayed on a screen and an angle-of-projection correcting mechanism supporting the projection unit. The angle-of-projection correcting mechanism is located at a side surface of the projection unit, instead of on a bottom surface thereof, to correct the projection angle of the image projected from the projection unit onto the screen, while reducing the size of the projection-type display device.

6 Claims, 13 Drawing Sheets ion units 2 necessarily require the angle-of-view correcting mechanisms 50.

FIG. 15 is a diagram showing the appearance of a conventional angle-of-view correcting mechanism 50. In FIG. 15, 50*a* denotes an up-and-down moving plate that can be moved in the vertical direction Y, 50*b* denotes a horizontal-rotation moving plate that can be rotated as seen from the vertical direction Y, 50*c* denotes a right-and-left-inclination moving plate that can be inclined as seen from the front-back direction X, 50*d* denotes a front-and-back inclination moving plate that can be inclined as seen from the right-left direction Z, 50*e* denotes a frontward-and-backward moving plate that can be moved in the front-back direction X, and 50*f* denotes a right-and-left moving plate that can be moved in the right-left direction Z.

PROJECTION-TYPE DISPLAY DEVICE

BACKGROUND OF THE INVENTION

1. Field of the Invention

The present invention relates to a projection-type display device that projects an image outputted from a projection unit onto a screen from behind to display the video.

2. Description of the Background Art

FIG. 10 is a diagram showing the interior of a conventional multi-projector seen from a side. The multi-projector described here includes projection-type display devices (rear projection type video projectors) stacked vertically and laterally to display one large screen. FIG. 10 shows two conventional projection-type display devices 300 stacked vertically. In FIG. 10, the reference numeral 13 denotes a cabinet (the body of the projection-type display device), 2 denotes a projection unit provided in the rear part in the cabinet 13 for projecting an image (output video) forward, 3 denotes a screen provided in the front of the cabinet 13, and 50 denotes an angle-of-view correcting mechanism (an angle-of-view correcting mechanism device) that supports the projection unit 2 in the lower part of the cabinet 13 to adjust the direction of the projection unit 2 to correct the angle of view of the image projected from the projection unit 2 onto the screen 3.

As shown in FIG. 10, the image is projected directly from the backside of the screen 3. In this case, the dimension of the projection-type display device in the depth (front-back) direction X must be set long. FIG. 11 shows projection-type display devices 200 devised to shorten the dimension in the depth direction X. In FIG. 11, the reference numeral 12 denotes a cabinet (the body of the projection-type display device), and 2, 3 and 50 denote the projection unit, screen, and view-of-angle correcting mechanism entirely the same as those shown in FIG. 10.

In the projection-type display device 200, the projection unit 2 is provided in the lower part in the cabinet 12 to project the image upwardly, and the screen 3 is located in the upper front of the cabinet 12. Additionally, it has a reflecting mirror 4 provided in the upper part in the cabinet 12, which receives the image and reflects it toward the screen 3. The angle-of-view correcting mechanism 50 supports the projection unit 2 on the bottom of the cabinet 12, similarly to that shown in FIG. 10.

FIGS. 12 to 14 are conceptual diagrams showing images projected on the screen 3, which show the images shifted off the screen 3. The images are shifted off on the screen 3 due to the following six kinds of deviations and combinations thereof: vertical deviation, lateral deviation, inclination, projecting magnification, vertical trapezoidal distortion, and transverse trapezoidal distortion. In FIG. 12, 51*a* shows an image projected with insufficient projecting magnification with respect to the screen 3. 51*b* shows an image projected with an undesired inclination. 51*c* shows an image projected with vertical and lateral deviation. In FIG. 13, 51*d* shows an image projected with vertical trapezoidal distortion. In FIG. 14, 51*e* shows an image projected with transverse trapezoidal distortion.

Conventionally, cathode-ray tubes have chiefly been applied as the projection units 2, which allow easy correction to the deviations on the screen 3 with electric circuitry. With the recent trend toward digitization, however, there is now a growing tendency to mainly use liquid-crystal devices and digital mirror devices (DMD). Since the optical path cannot be electrically corrected with these devices, the projection units 2 necessarily require the angle-of-view correcting mechanisms 50.

Next, operation of the projection-type display device 200 will be described referring to FIGS. 11 to 15. The image projected from the projection unit 2 is reflected at the reflecting mirror 4 and produced on the screen 3. The projecting magnification of the image 51*a* produced on the screen 3 can be corrected by moving the up-and-down moving plate 50*a* in the vertical direction Y. The inclination of the image 51*b* produced on the screen 3 can be corrected by rotating the horizontal-rotation moving plate 50*b*. The transverse trapezoidal distortion of the image 51*e* produced on the screen 3 can be corrected by inclining the right-and-left-inclination moving plate 50*c*. The vertical trapezoidal distortion of the image 51*d* on the screen 3 can be corrected by inclining the front-and-back-inclination moving plate 50*d*. The vertical and lateral deviation of the image 51*c* on the screen 3 can be corrected by moving the forward-and-backward moving plate 50*e* and the right-and-left moving plate 50*f* respectively in the front-back direction X and the right-left direction Z As described above, in the conventional projection-type display device 200 shown in FIG. 11, the angle-of-view correcting mechanism 50 includes as many as six moving plates and has a long dimension in the vertical direction Y. Accordingly, installing the angle-of-view correcting mechanism 50 on the bottom surface of the projection unit 2 requires the cabinet 12 to be shaped in a downwardly extended form. This hinders downsizing of the body of the video projector.

Particularly, with the multi-projector, shown in FIG. 11, the extended part 121 protruding in the lower part of the cabinet 12 is formed to go into the projection-type display device 200 lying immediately below. The projection-type display device 200 underneath contains the reflecting mirror 4. Hence, the extended part 121 must be extended downward along the reflecting mirror 4 in the projection-type display device 200 right below, which requires the projection-type display device 200 right above to be long-sized in the front-back direction X.

SUMMARY OF THE INVENTION

According to a first aspect of the present invention, a projection-type display device comprises: a projection unit for projecting an image to be displayed on a screen; and an angle-of-view correcting mechanism supporting the projection unit not on a bottom surface of the projection unit but on a side surface of the projection unit, for correcting an angle of view of the image projected on the screen from the projection unit.

Preferably, according to a second aspect of the present invention, in the projection-type display device, the angle-of-view correcting mechanism comprises a body of the mechanism including a side surface facing the side surface of the projection unit and an upper surface, and a direction setting portion provided on the side surface and the upper surface, for setting the direction of the projection unit to correct the angle of view.

Preferably, according to a third aspect of the present invention, in the projection-type display device, the body of the mechanism comprises at least one moving plate, and the direction setting portion comprises a coupling portion for coupling the plurality of moving plates in a position-adjustable manner.

Preferably, according to a fourth aspect of the present invention, in the projection-type display device, the coupling portion comprises a pinch mechanism which pinches and holds the at least one moving plate in a position-adjustable manner with an energizing force of an energizing portion.

Preferably, according to a fifth aspect of the present invention, in the projection-type display device, the coupling portion comprises a wedge mechanism which fits in with and holds the at least one moving plate in a position-adjustable manner with a fitting force of a wedge.

Preferably, according to a sixth aspect of the present invention, in the projection-type display device, the coupling portion comprises a link ball mechanism which supports the at least one moving plate in a position-adjustable manner with a linking force of a link ball.

According to the first aspect of the present invention, the projection unit can be placed in a lower position with respect to the bottom of the projection-type display device since it is supported not on its bottom surface but on its side surface. This provides the effect of shortening the dimension of the projection-type display device normal to the display screen.

According to the second aspect of the present invention, the direction of the projection unit can be set not from its bottom but from side and above, which provides increased ease in correction of the angle of view.

According to the third aspect of the present invention, the coupling portion allows the structure of the direction setting portion to be simplified.

According to the fourth aspect of the present invention, the pinch mechanism allows the structure of the direction setting portion to be simplified.

According to the fifth aspect of the present invention, the wedge mechanism allows the structure of the direction setting portion to be simplified.

According to the sixth aspect of the present invention, the link ball mechanism allows the structure of the direction setting portion to be simpler.

The present invention has been made to solve the problems explained above, and an object of the present invention is to obtain a projection-type display device having a shorter dimension in the front-to-back direction.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
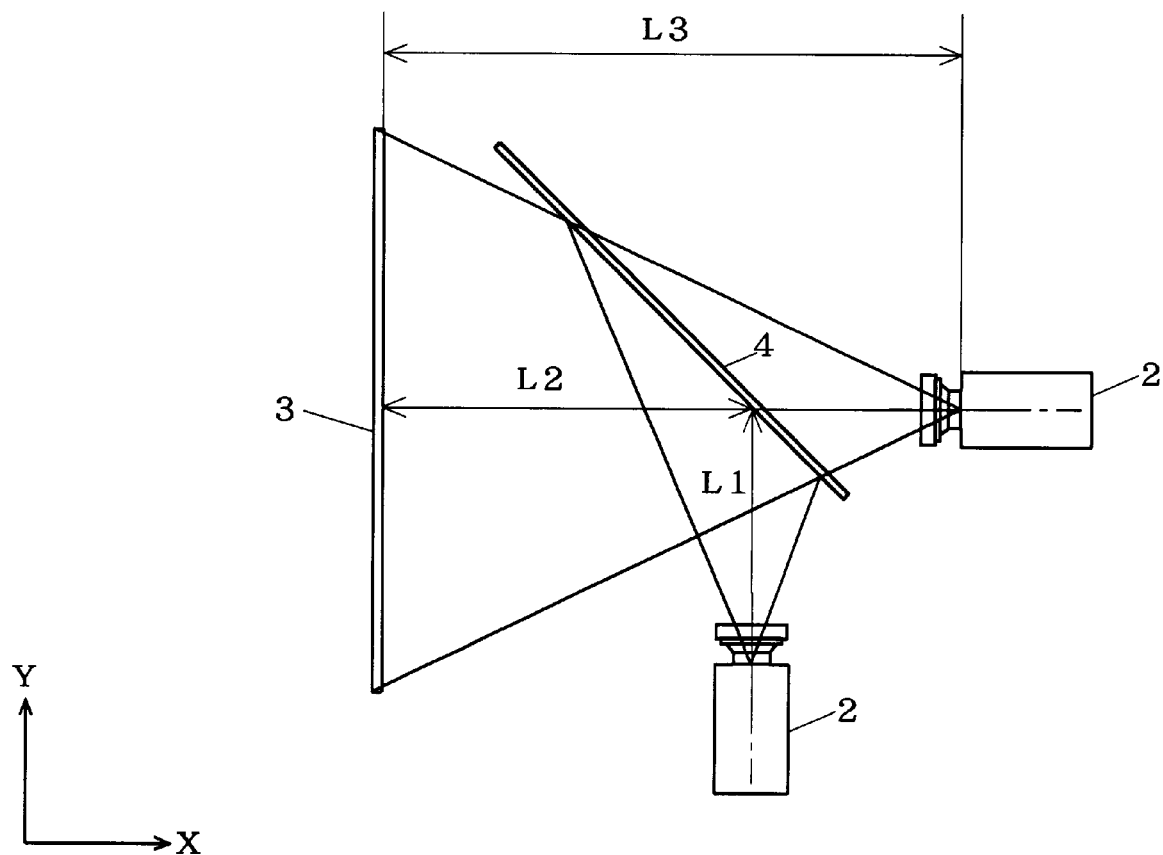
FIG. 1 is a conceptual diagram used to describe a projection-type display device according to the present invention.
Figure 10:
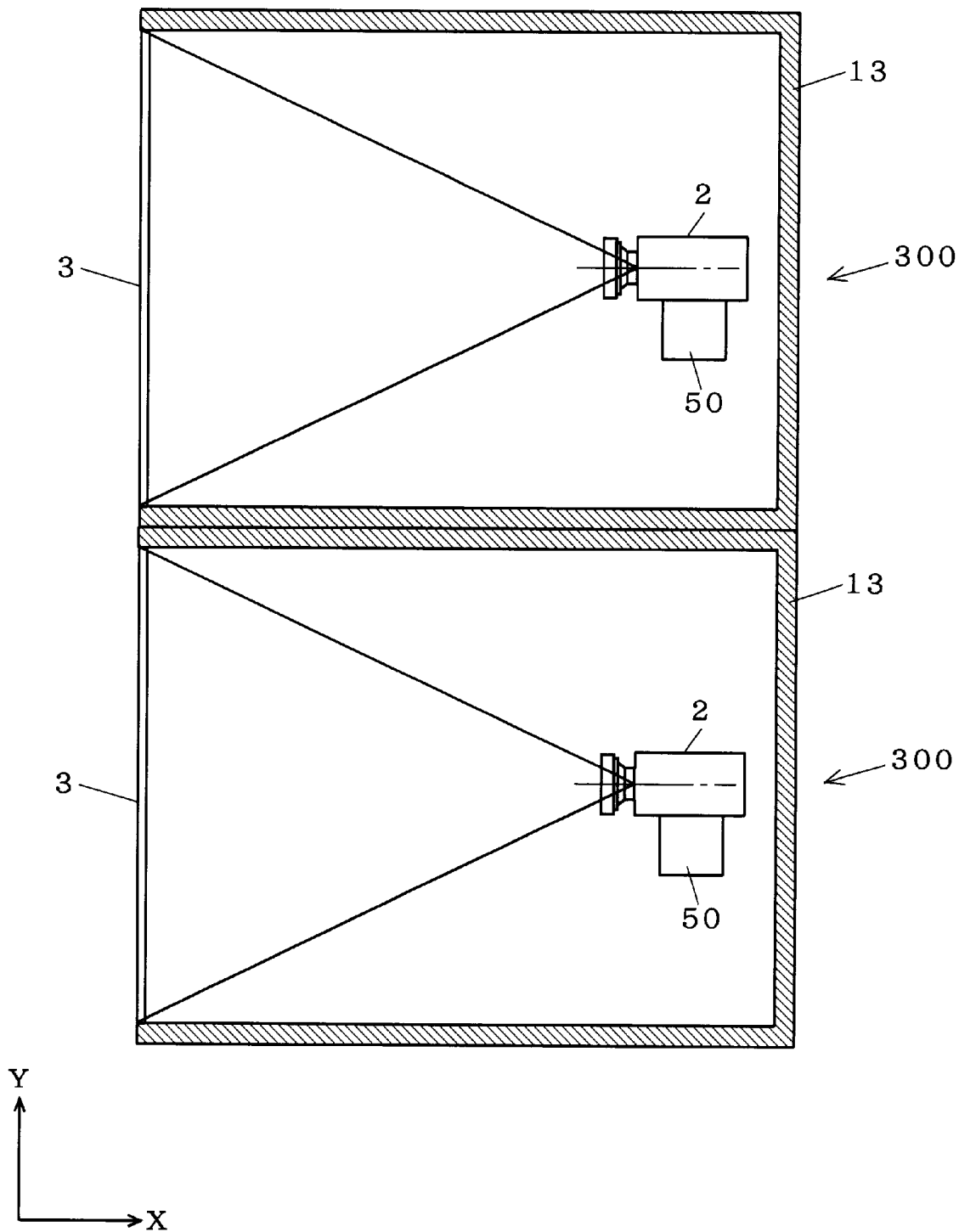
FIG. 10 is a sectional view showing conventional projection-type display devices.
Figure 11:
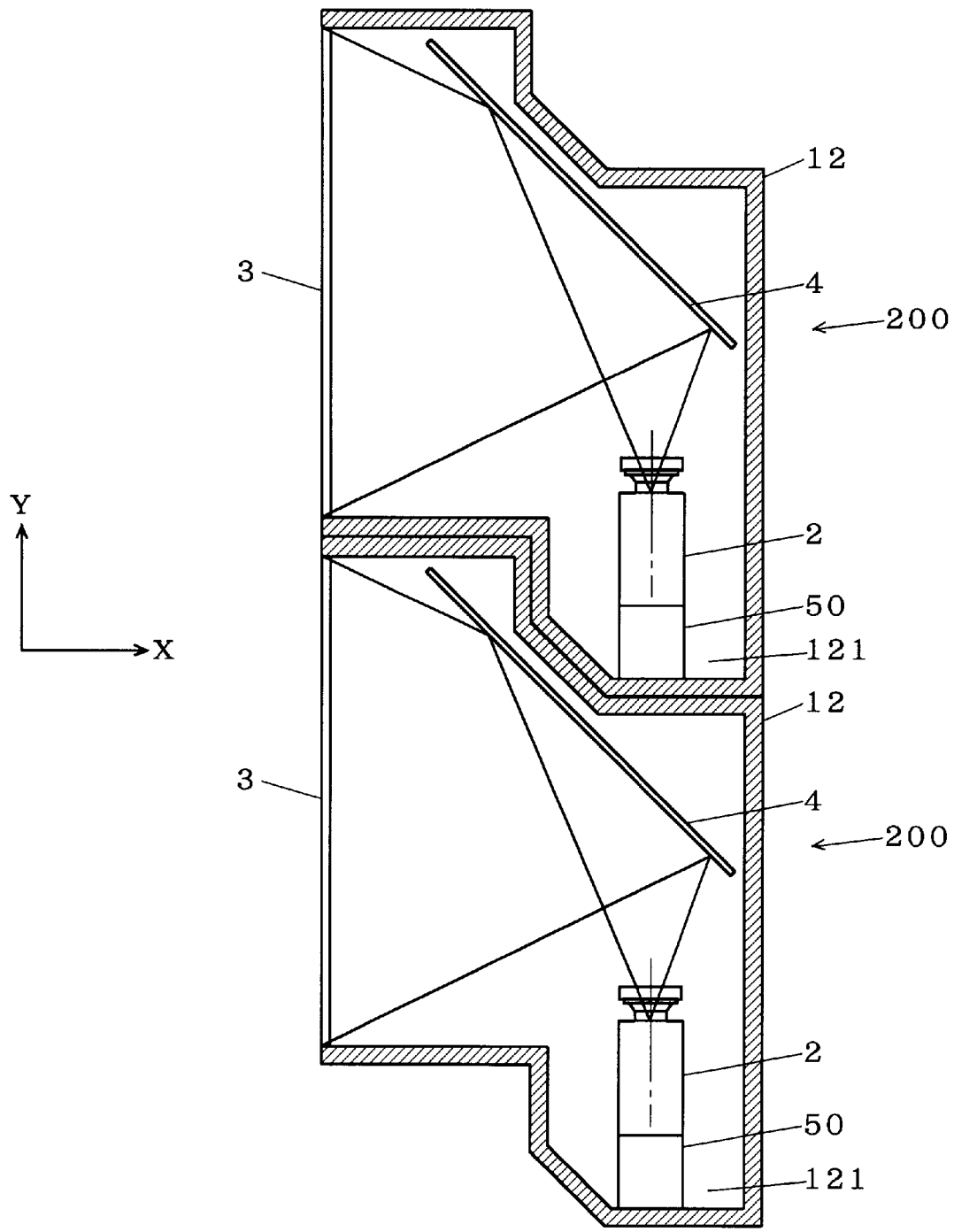
FIG. 11 is a sectional view showing conventional projection-type display devices.
Figure 12:
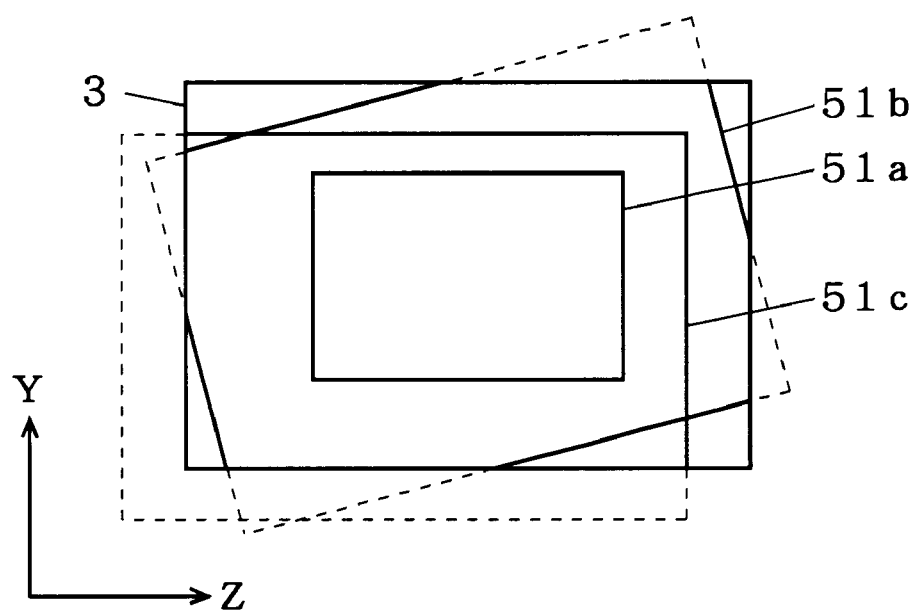
FIG. 12 is a diagram showing examples of images produced on a screen.
Figure 13:
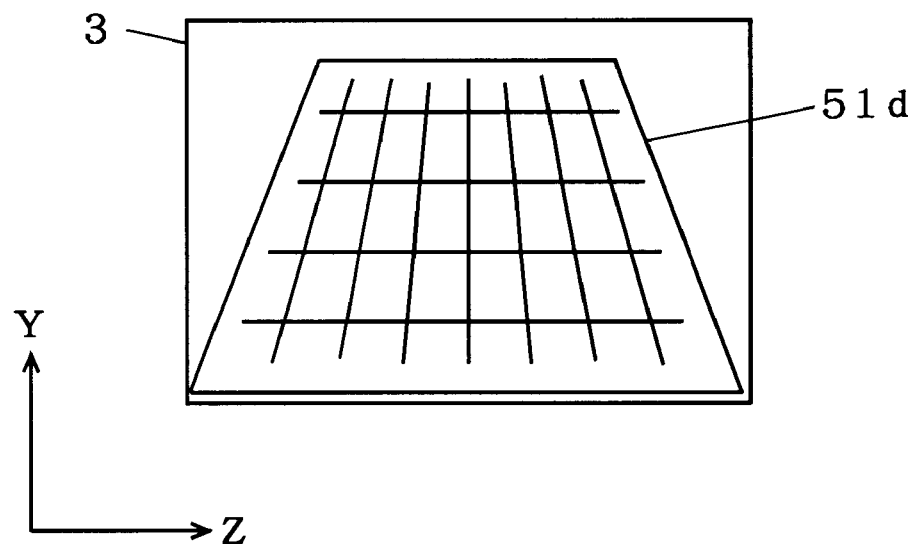
FIG. 13 is a diagram showing an example of an image produced on the screen.
Figure 14:
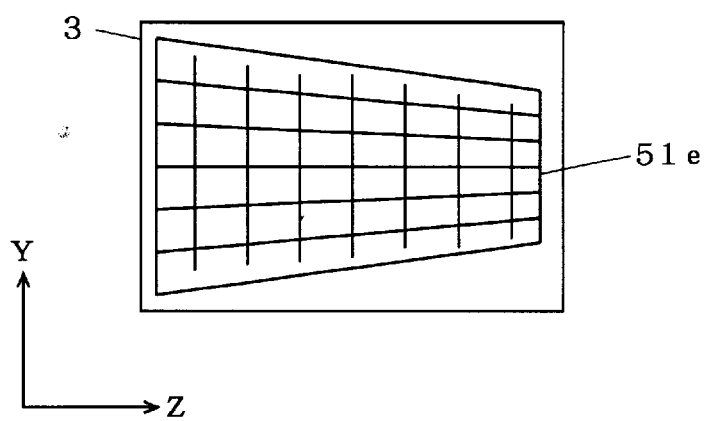
FIG. 14 is a diagram showing an example of an image produced on the screen.
Figure 15:
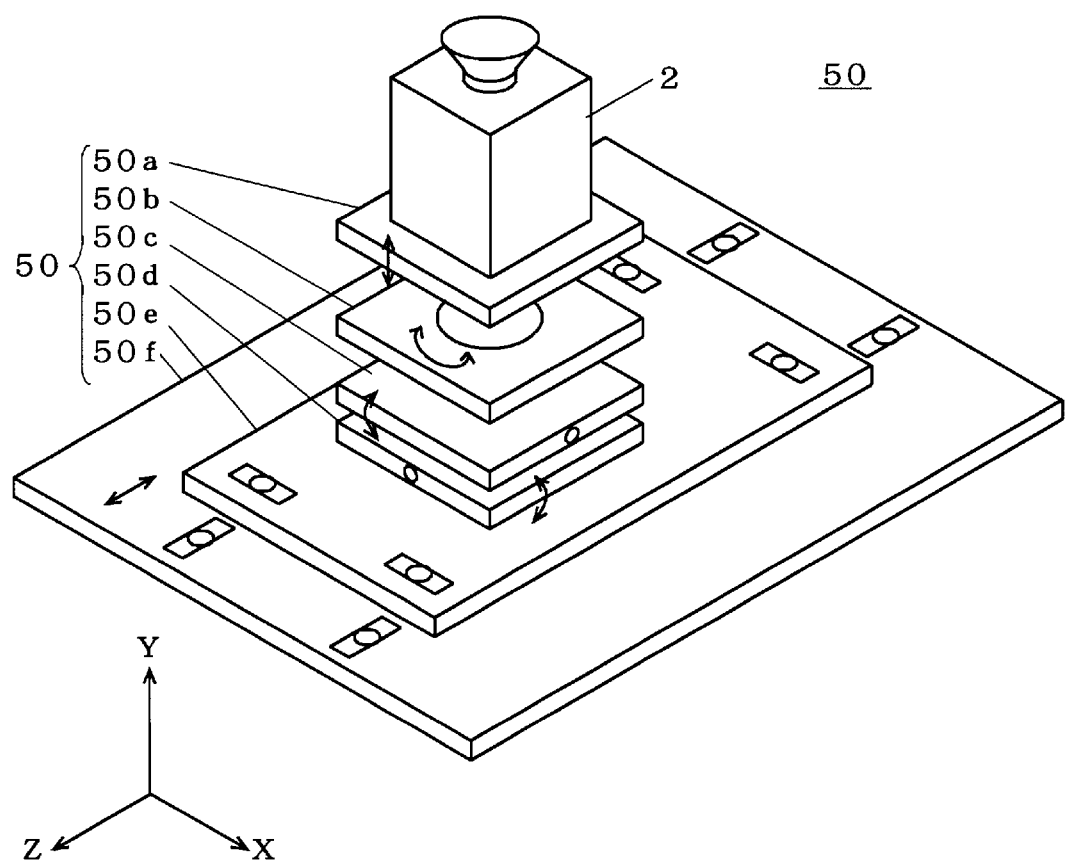
FIG. 15 is an external view showing a conventional angle-of-view correcting mechanism for the projection-type display device.

FIG. 1 is a diagram used to explain the principle of the present invention, which shows the screen 3 and the projection unit 2 in the projection-type display device 300 shown in FIG. 10 and the screen 3, the projection unit 2, and the reflecting mirror 4 in the projection-type display device 200 shown in FIG. 11 in overlap.

As shown in FIG. 1, the reflecting mirror 4 merely converts the direction of the image (output video) from the vertical (top-bottom) direction Y into the depth (front-back) direction X. The distance of the light propagation from the projection unit 2 to the screen 3 is taken as L3, the distance of the light propagation from the projection unit 2 to the reflecting mirror 4 is taken as L1, and the distance of the light propagation from the reflecting mirror 4 to the screen 3 is taken as L2. In this case, the following relation holds:

$$L3 = L1 + L2 \tag{1}$$

The dimension of the projection-type display device in the depth direction X can be reduced by shortening the distance L2. The distance L2 can be shortened by lengthening the distance L1.

Figure 2:
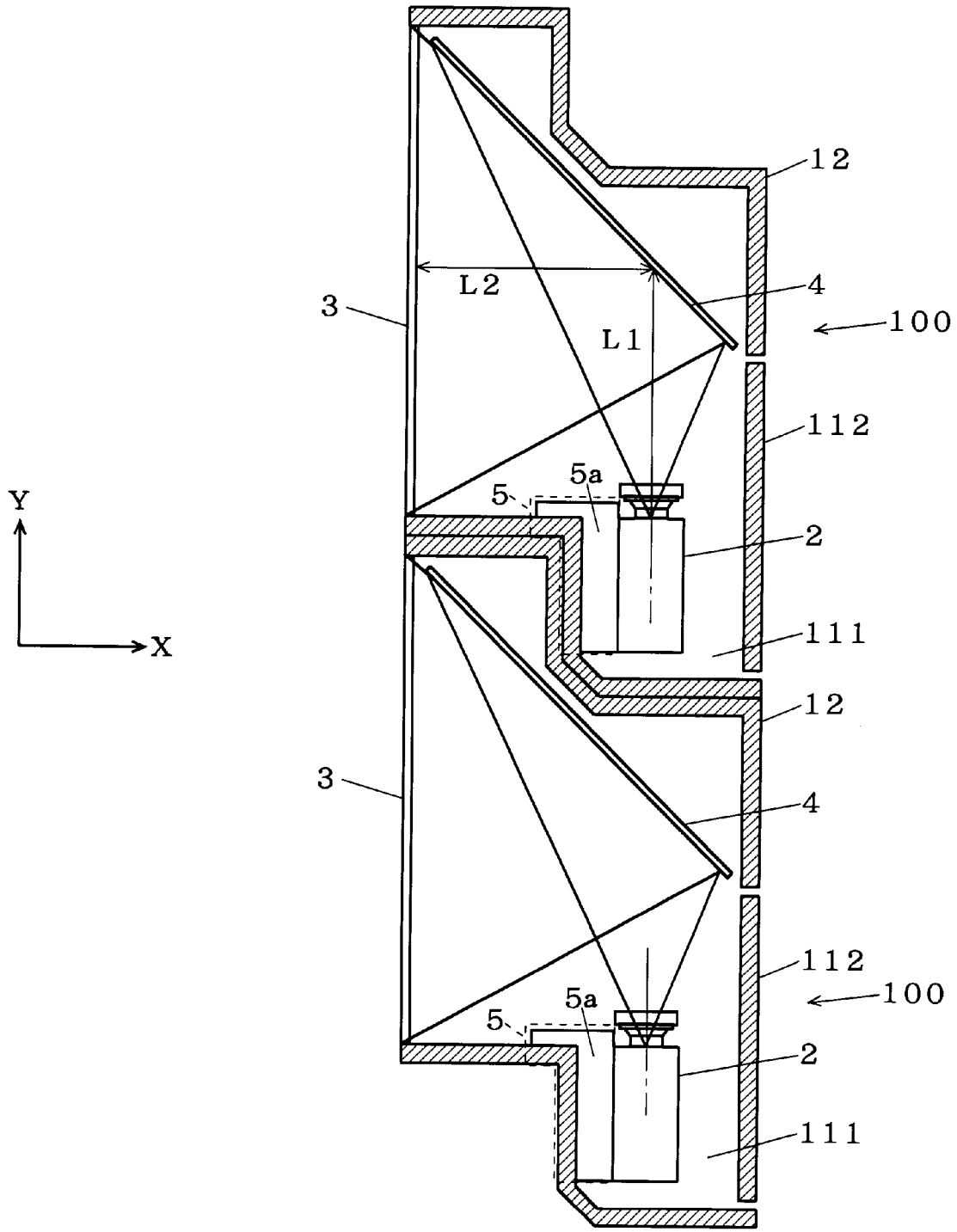
FIG. 2 is a sectional view showing projection-type display devices according to a first preferred embodiment of the present invention.

Accordingly, while the conventional angle-of-view or projection correcting mechanism 50 supports the projection unit 2 on its bottom surface as shown in FIG. 11, an angle-of-view correcting mechanism 5 (an angle-of-view correcting mechanism device) of the present invention supports the projection unit 2 not on its bottom surface but on its side surface, as shown in FIG. 2. This allows the projection unit 2 to be more closely placed to the bottom of the projection-type display device 100, thereby lengthening the distance 21 and allowing a decrease in the distance 12 as well as the overall depth of the projection-type display device 100. The projection units 2, the screens 3, and the reflecting mirrors 4 shown in FIG. 2 are entirely the same as those shown in FIG. 11. In FIG. 2, the reference numeral 11 denotes a cabinet (the body of the projection-type display device), 111 denotes an extended part that protrudes in the lower part of the cabinet 11, and 112 denotes a cover for allowing the interior to be seen.

The bottom surface of the cabinet 11 is stepped as shown in FIG. 2. This step is formed of its side facing the side surface of the projection unit 2 and its upper surface. The angle-of-view correcting mechanism 5 includes a direction setting portion 5a for setting the direction of the projection unit 2 to correct the angle of view, and the body of the mechanism including the stepped part of the bottom of the cabinet 11.

The first preferred embodiment provides the following effects. That is to say, since the angle-of-view correcting mechanism 5 in the projection-type display device 100 shown in FIG. 2 supports the projection unit 2 not on its bottom surface but on its side surface, the projection unit 2 can be positioned in a still lower position, which allows the distance L1 to be set longer than that in the projection-type display device 200 shown in FIG. 11. As the distance L1 becomes longer, the distance L2 becomes shorter, which shortens the dimension of the projection-type display device in the depth (front-back) direction X. Although the dimension in the vertical direction Y of the projection-type display device 100 shown in FIG. 2 is the same as that of the projection-type display device 200 shown in FIG. 11, its dimension in the depth direction X is shorter.

Further, since the direction of the projection unit can be set not from the bottom surface side of the projection unit 2 but from its side and above, the angle of view can be corrected easily.

Second Preferred Embodiment

Adopting the same structure as the conventional angle-of-view correcting mechanism 50 having the long dimension as the angle-of-view correcting mechanism 5 shown in FIG. 2 lengthens the dimension of the cabinet 11 in the depth direction X.

Figure 3:
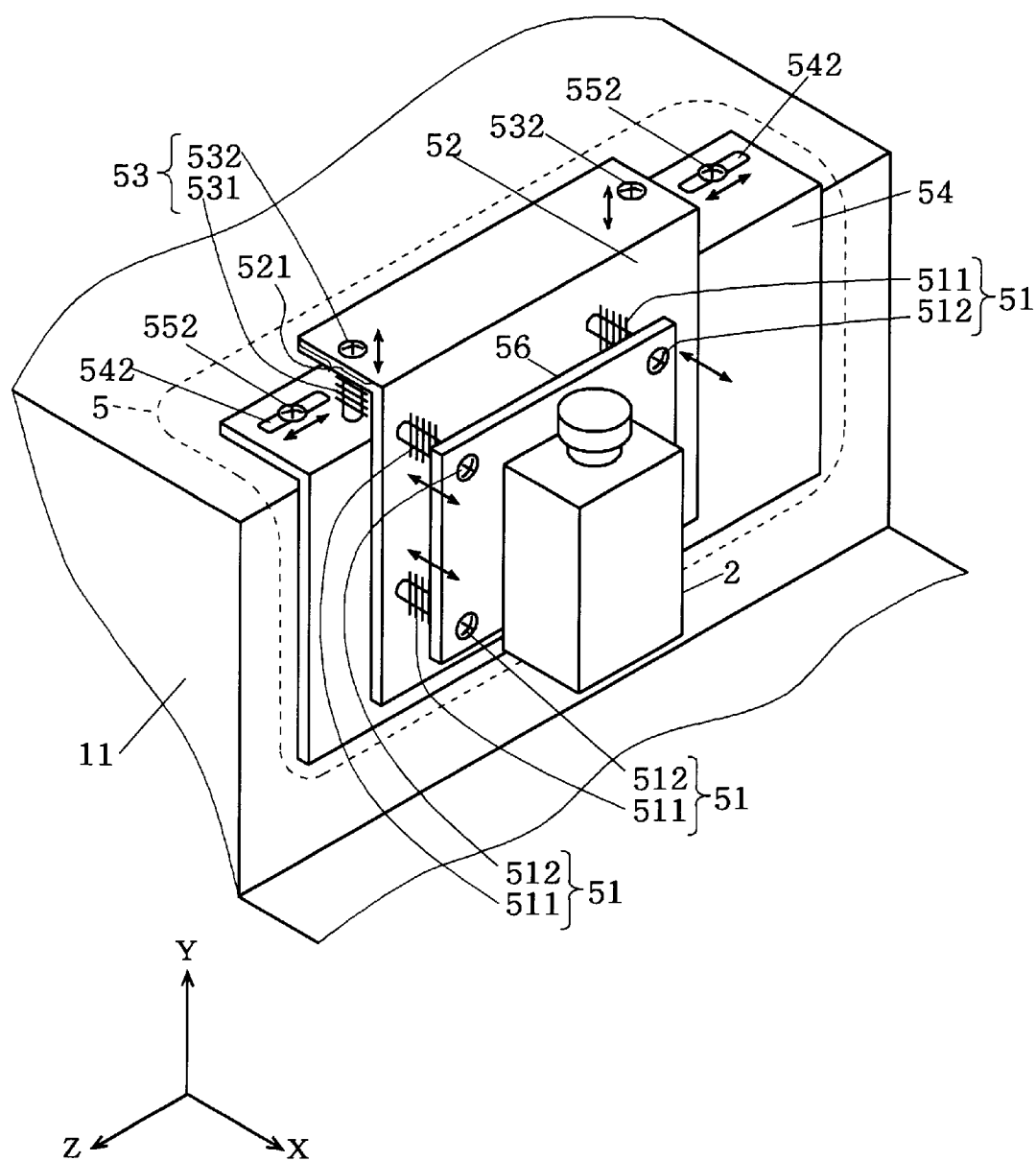
FIG. 3 is an external view showing an angle-of-view correcting mechanism for the projection-type display device in a second preferred embodiment of the present invention.
Figure 4:
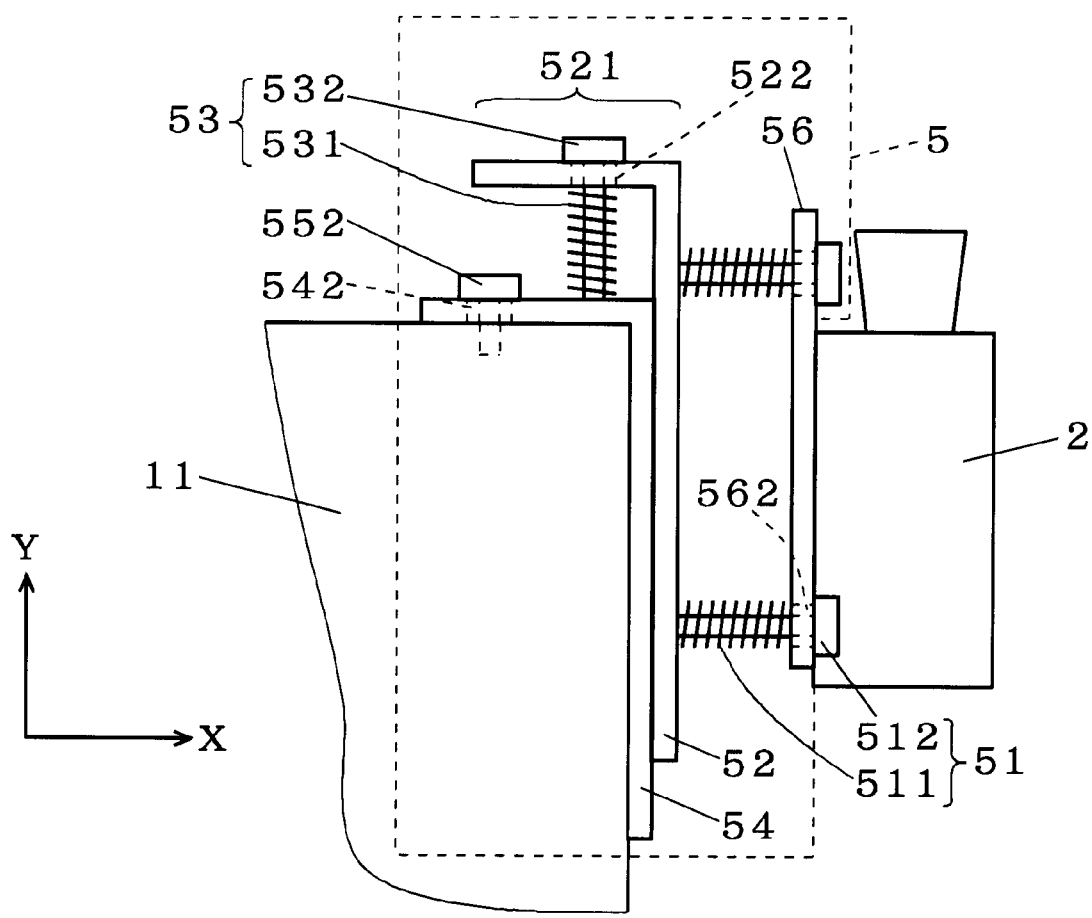
FIG. 4 is a sectional view showing the angle-of-view correcting mechanism of the projection-type display device of the second preferred embodiment of the present invention.

FIG. 3 shows the appearance of an angle-of-view correcting mechanism 5 for the projection-type display device in a second preferred embodiment of the present invention. FIG. 4 shows a section of the angle-of-view correcting mechanism 5 of FIG. 3 as seen in the lateral (right-left) direction Z. In FIG. 3 and FIG. 4, the reference numeral 56 shows a moving plate having at least three front-to-back through holes 562 and facing the cabinet 11, for directly supporting the projection unit 2, 52 denotes a moving plate facing the cabinet 11 and for indirectly supporting the projection unit 2, 54 denotes a moving plate having vertical through holes 542 and facing the cabinet 11, for indirectly supporting the projection unit 2, 51 denotes at least three forward-and-backward expanding/retracting members (coupling portion) each having its one end connected to the side of the cabinet 11 and the other end connected to the side of the projection unit 2, and 53 denotes at least two up-and-down expanding/retracting members (coupling portion) each having its one end connected to the side of the cabinet 11 and the other end connected to the side of the projection unit 2. The moving plates 52, 54, and 56 are included in the body of the angle-of-view correcting mechanism 5.

The moving plate 52 has a protruding part 521 as its part, which faces the bottom surface of the cabinet 11. The protruding part 521 has at least two vertical through holes 522.

Each frontward-and-backward expanding/retracting member 51 includes a front-to-back coiled spring 511 and a front-to-back screw 512. The front-to-back screw 512 is screwed into the moving plate 52 through the front-to-back through hole 562 and the front-to-back coiled spring 511. When the front-to-back screw 512 is turned in a given direction, it goes into the moving plate 52. When turned in the reverse direction, it comes out from the moving plate 52. The front-to-back coiled spring 511 stretches out the interval between the moving plate 52 and the moving plate 56 with appropriate strength. The frontward-and-backward expanding/retracting members 51 are thus adjustable in length, which couple the moving plate 56 and the moving plate 52 at adjustable interval. Adjusting the lengths of the three frontward-and-backward expanding/retracting members 51 causes the projection unit 2 to somewhat rotate as seen from the vertical direction Y, to move forward and backward in the depth direction X, or to incline as seen from the lateral (right-left) direction Z.

Each up-and-down expanding/retracting member 53 is formed of a vertical coiled spring 531 and a vertical screw 532. The vertical screw 532 is screwed into the moving plate 54 through the vertical through hole 522 and the vertical coiled spring 531. The vertical screw 532 goes into the moving plate 54 when turned in a given direction, and comes out from the moving plate 54 when turned in the reverse direction. The vertical coiled spring 531 stretches out the interval between the moving plate 54 and the protruding part 521 with appropriate strength. The up-and-down expanding/retracting members 53 are thus adjustable in length, which couple the protruding part 521 to the moving plate 54 at adjustable interval. Adjusting the lengths of the two up-and-down expanding/retracting members 53 moves the projection unit 2 in the vertical direction Y or inclines it as seen in the depth direction X.

The moving plate 54 has two vertical through holes 542. A vertical screw 552 is screwed into the cabinet 11 through a corresponding vertical through hole 542. When turned in a given direction, the vertical screw 552 goes into the cabinet 11, and comes out from the cabinet 11 when turned in the reverse direction. The vertical through holes 542 are elongated in the lateral (right-left) direction Z. Accordingly, turning the vertical screws 552 in the given direction fixes the moving plate 54 on the cabinet 11, and turning the vertical screws 552 in the reverse direction allows the moving plate 54 to be moved in the lateral direction Z.

As described above, the coupling portion (the frontward-and-backward expanding/retracting members 51 and the up-and-down expanding/retracting members 53) couples the moving plates in a postion-adjustable manner.

The second preferred embodiment provides the following effects. That is to say, since the angle-of-view correcting mechanism 5 has only three moving plates, it can be sized shorter in the depth (front-back) direction X as compared with the conventional angle-of-view correcting mechanism 50. This makes the dimension of the cabinet 11 shorter in the depth direction X.

Further, since the angle-of-view correcting mechanism 5 has fewer parts, or fewer moving plates, than the conventional angle-of-view correcting mechanism 50, it can be produced at lower cost.

Moreover, similarly to the conventional angle-of-view correcting mechanism 50, the angle-of-view correcting mechanism 5 can produce movement in the vertical direction Y, some rotation as seen from the vertical direction Y, inclination as seen from the depth direction X, inclination as seen from the lateral direction Z, movement in the depth direction X, and movement in the lateral direction Z. Hence the angle-of-view correcting mechanism 5 can correct the six kinds of deviations and combinations thereof described in the background art, similarly to the conventional angle-of-view correcting mechanism 50.

Further, since a multi-projector is formed of projection-type display devices placed on top of each other in vertical and lateral directions, the cover 112 for allowing the interior of the projection-type display device to be seen can be provided only in the back of the projection-type display device 100 as shown in FIG. 2. When the cover 112 is opened and the interior is seen, the tops of the front-to-back screws 512 are seen in the front and the tops of the vertical screws 532 are seen above the projection unit 2 over the projection unit 2. Accordingly, it is easy to turn the front-to-back screws 512 and the vertical screws 532 with a screwdriver.

Third Preferred Embodiment

Figure 5:
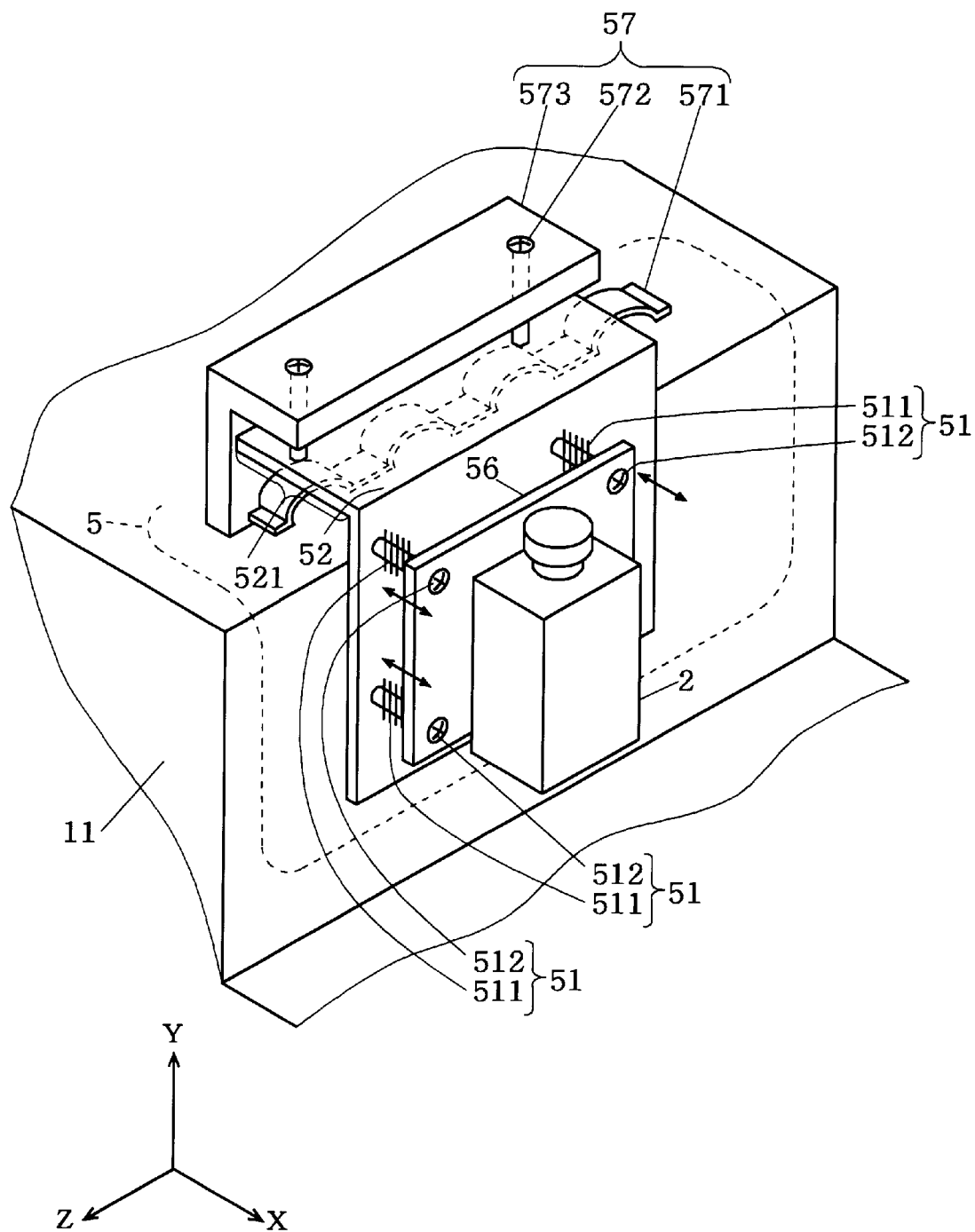
FIG. 5 is an external view showing an angle-of-view correcting mechanism for the projection-type display device in a third preferred embodiment of the present invention.
Figure 6:
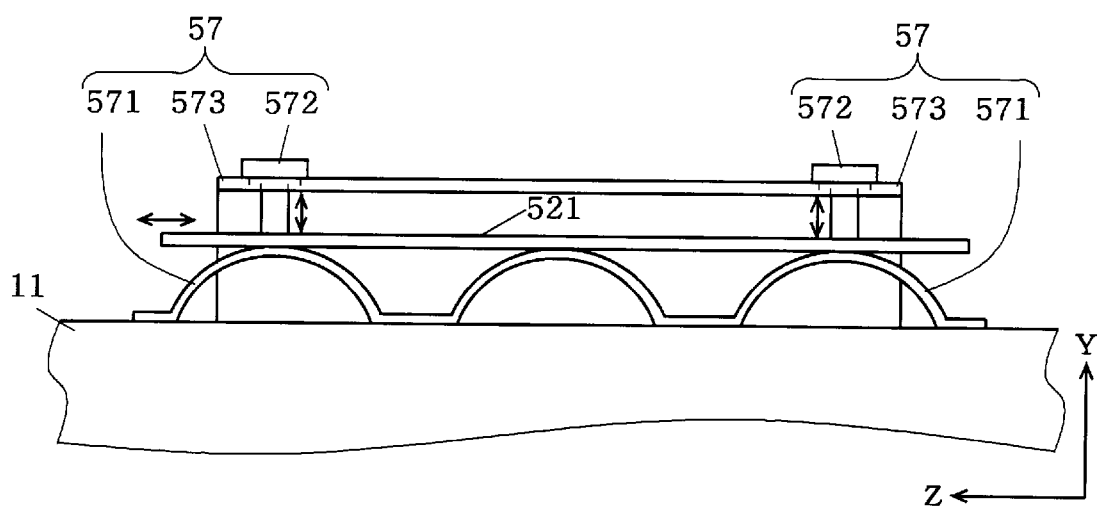
FIG. 6 is a sectional view showing the angle-of-view correcting mechanism of the projection-type display device of the third preferred embodiment of the present invention.

FIG. 5 is a diagram showing the appearance of an angle-of-view correcting mechanism 5 for the projection-type display device according to a third preferred embodiment of the present invention. FIG. 6 shows a section of the angle-of-view correcting mechanism 5 of FIG. 5 as seen in the depth (front-back) direction X. In FIG. 5 and FIG. 6, 57 denotes a pinch mechanism provided on the bottom surface of the cabinet 11, for pinching and fixing the protruding part 521 above the cabinet 11, 573 denotes the main part of the pinch mechanism fixed on the bottom surface of the cabinet 11, 571 denotes a vertical plate spring for pushing up the protruding part 521, 572 denotes vertical screws for pushing down the protruding part 521, and the other reference numerals correspond to those in FIG. 3 and FIG. 4. The vertical plate spring 571, the vertical screws 572, and the main part of the pinch mechanism 573 form the pinch mechanism 57, and the pinch mechanism 57 is included in the coupling portion.

The vertical screws 572 pass through the main part of the pinch mechanism 573. When turned in a given direction, the vertical screws 572 go into the main part of the pinch mechanism 573 to push down the protruding part 521. When turned in the reverse direction, they come out from the main part of the pinch mechanism 573. The vertical plate spring 571 pushes up the protruding part 521 with appropriate strength. The pinch mechanism 57 thus pinches and couples the protruding part 521 to the cabinet 11 at adjustable interval. Accordingly, turning the vertical screws 572 in the given direction fixes the protruding part 521 above the cabinet 11, and turning the vertical screws 572 in the reverse direction allows the moving plate 52 to be moved in the lateral (right-left) direction Z, for example. Further, turning both of the two vertical screws 572 causes the projection unit 2 to move in the vertical (top-bottom) direction Y or to incline as seen in the depth (front-back) direction X.

Moreover, as has been described in the second preferred embodiment, adjusting the lengths of the three forward-and-backward expanding/retracting members 51 causes the projection unit 2 to somewhat rotate as seen from the vertical direction Y, to move in the depth direction X, or to incline as seen from the lateral direction Z.

As described above, the pinch mechanism 57 pinches and holds the moving plates in a position-adjustable manner with the energizing force of the energizing portion (the vertical plate spring 571).

The third preferred embodiment provides the following effects. That is to say, the angle-of-view correcting mechanism 5 having only two moving plates can be sized shorter in the depth (front-back) direction X than the conventional angle-of-view correcting mechanism 50. This allows the cabinet 11 to be sized shorter in the depth direction X.

Further, in the third preferred embodiment, the absence of the moving plate 54 allows the projection unit 2 to be located in a still lower part in the cabinet 11 than in the second preferred embodiment. This further downsizes the projection-type display devices 100 in the depth direction X.

Moreover, the angle-of-view correcting mechanism 5 having fewer parts, or fewer moving plates, than the conventional angle-of-view correcting mechanism 50 can be produced at lower cost.

Moreover, similarly to the conventional angle-of-view correcting mechanism 50, the angle-of-view correcting mechanism 5 can produce movement in the vertical direction Y, some rotation as seen from the vertical direction Y, inclination as seen from the depth direction X, inclination as seen from the lateral direction Z, movement in the depth direction X, and movement in the lateral direction Z. Hence the angle-of-view correcting mechanism 5 can correct the six kinds of deviations and combinations thereof described in the background art, similarly to the conventional angle-of-view correcting mechanism 50.

Further, since the multi-projector is formed of projection-type display devices placed on top of each other in vertical and lateral directions, the cover 112 for allowing the interior to be seen can be provided only in the back of the projection-type display device 100 as shown in FIG. 2. When the cover 112 is opened and the interior is seen, the tops of the front-to-back screws 512 are seen in the front and the tops of the vertical screws 572 are seen above the projection unit 2 over the projection unit 2. Accordingly, it is easy to turn the front-to-back screws 512 and the vertical screws 572 with a screwdriver.

Fourth Preferred Embodiment

Figure 7:
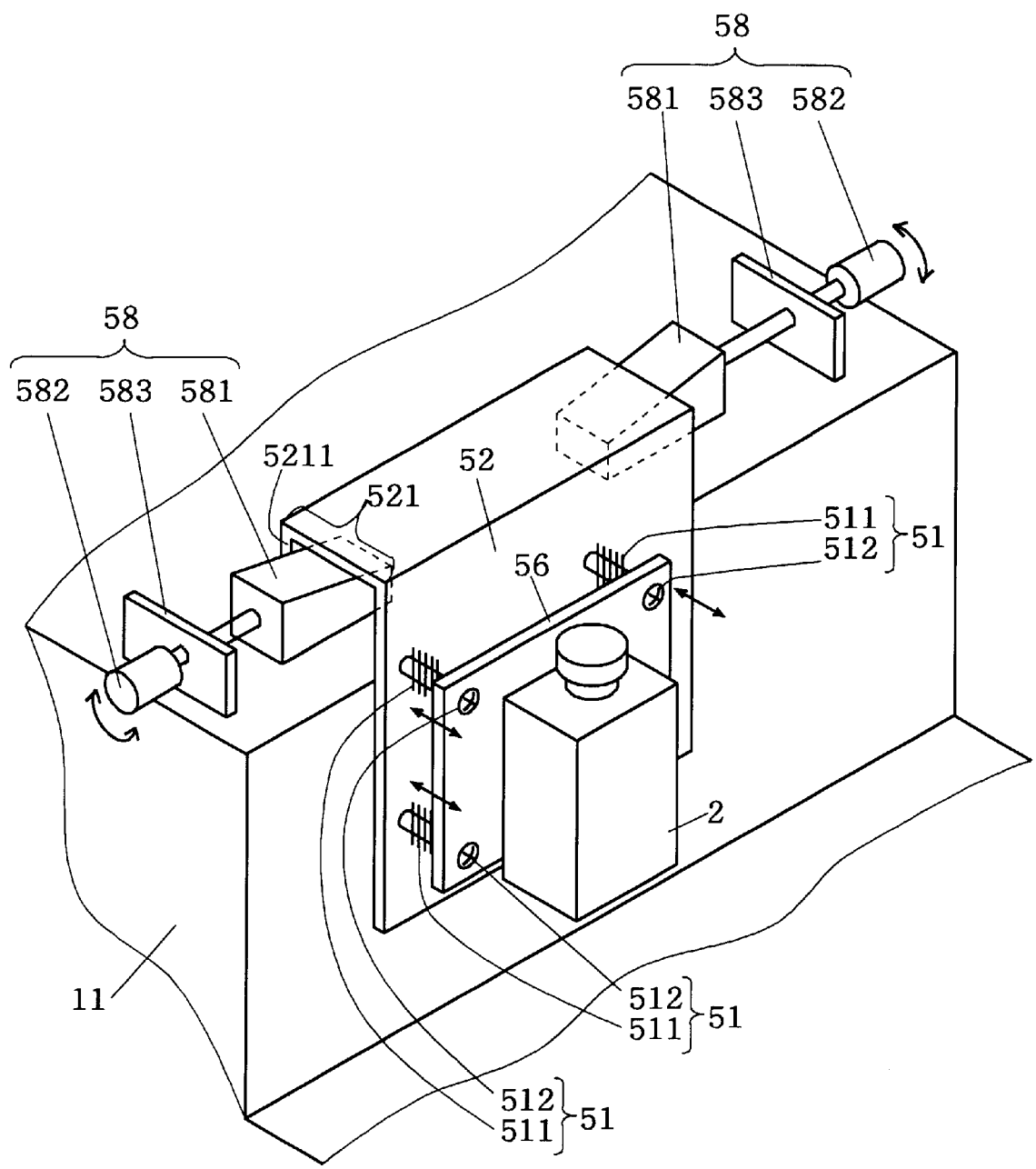
FIG. 7 is an external view showing an angle-of-view correcting mechanism for the projection-type display device in a fourth preferred embodiment of the present invention.

FIG. 7 is a diagram showing the appearance of an angle-of-view correcting mechanism 5 for the projection-type display device according to a fourth preferred embodiment of the present invention. In FIG. 7, 58 denotes a wedge mechanism, which forces in triangular wedges 581 between the cabinet 11 and the protruding part 521 from both sides of the protruding part 521 in the lateral (right-left) direction Z. The reference numeral 583 denotes the main parts of the wedge mechanism fixed on the bottom surface of the cabinet 11, 582 denotes lateral screws for moving the wedges 581 in the lateral direction Z, 5211 denotes a stopper provided on the protruding part 521 for preventing the moving plate 52 from falling down onto the bottom surface of the extended part 111, and the other reference numerals correspond to those in FIG. 3. The wedges 581, the lateral screws 582, and the main parts of the wedge mechanism 583 form the wedge mechanism 58, which is included in the coupling portion.

The lateral screws 582 pass through the main parts of the wedge mechanism 583. When turned in a given direction, the lateral screws 582 go into the main parts of the wedge mechanism 583 to force in the wedges 581 between the bottom surface of the cabinet 11 and the protruding part 521. When they are turned in the reverse direction, the wedges 581 are drawn out from between the bottom surface of the cabinet 11 and the protruding part 521.

As the two wedges 581 are inserted between the bottom surface of the cabinet 11 and the protruding part 521, the projection unit 2 moves in the vertical direction Y.

When one of the two lateral screws 582 is turned in the given direction and the other one is turned in the reverse direction to move both of the wedges 581 rightward or leftward, the projection unit 2 can be moved in the lateral (right-left) direction Z.

Further, turning one of the two lateral screws 582 can cause the projection unit 2 to incline, as seen in the depth direction X.

Moreover, as has been described in the second preferred embodiment, adjusting the lengths of the three forward-and-backward expanding/ retracting members 51 can cause the projection unit 2 to somewhat rotate as seen from the vertical direction Y, to move in the depth direction X, or to incline as seen from the lateral direction Z.

As described above, the wedge mechanism 58 fits in with the moving plate and holds it in a position-adjustable manner with the fitting force of the wedges 581.

The fourth preferred embodiment provides the following effects. That is to say, the angle-of-view correcting mechanism 5 having only two moving plates can be sized shorter in the depth (front-back) direction X than the conventional angle-of-view correcting mechanism 50. This allows the cabinet 11 to be sized shorter in the depth direction X.

Further, in the fourth preferred embodiment, the absence of the moving plate 54 allows the projection unit 2 to be located in a lower part in the cabinet 11 than in the second preferred embodiment. This further downsizes the projection-type display devices 100 in the depth direction X.

Moreover, the angle-of-view correcting mechanism 5 having fewer parts, or fewer moving plates, than the conventional angle-of-view correcting mechanism 50 can be produced at lower cost.

Moreover, similarly to the conventional angle-of-view correcting mechanism 50, the angle-of-view correcting mechanism 5 can produce movement in the vertical direction Y, some rotation as seen from the vertical direction Y, inclination as seen from the depth direction X, inclination as seen from the lateral direction Z, movement in the depth direction X, and movement in the lateral direction Z. Hence the angle-of-view correcting mechanism 5 can correct the six kinds of deviations and combinations thereof described in the background art.

Further, since the multi-projector is formed of projection-type display devices placed on top of each other in vertical and lateral directions, the cover 112 for allowing the interior to be seen can be provided only in the back of the projection-type display device 100 as shown in FIG. 2. When the cover 112 is opened and the interior is seen, the tops of the front-to-back screws 512 are seen in the front and the tops of the lateral screws 582 are seen above the projection unit 2 over the projection unit 2. Accordingly, it is easy to turn the front-to-back screws 512 with a screwdriver and the lateral screws 582 by hand.

Further, as compared with the second and third preferred embodiments, it is possible to ensure more sufficient stability for supporting the projection unit 2, since the protruding part 521 is supported by the wedges 581. It is therefore more effective especially when the projection unit 2 is heavy in weight.

Fifth Preferred Embodiment

Figure 8:
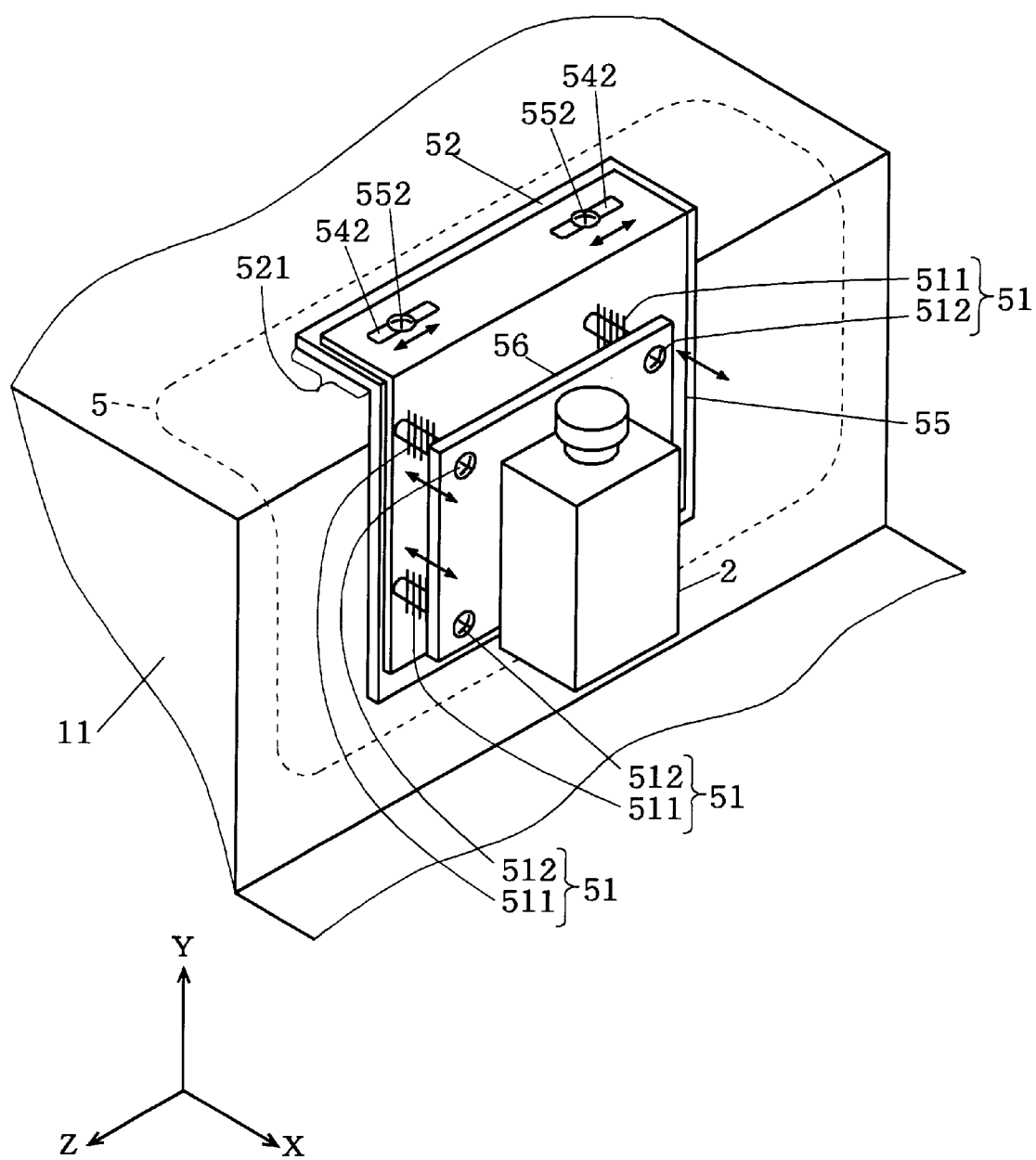
FIG. 8 is an external view showing an angle-of-view correcting mechanism for the projection-type display device in a fifth preferred embodiment of the present invention.

FIG. 8 is a diagram showing the appearance of an angle-of-view correcting mechanism 5 for the projection-type display device according to a fifth preferred embodiment of the present invention. The reference numerals in FIG. 8 correspond to those in FIG. 3.

Figure 9:
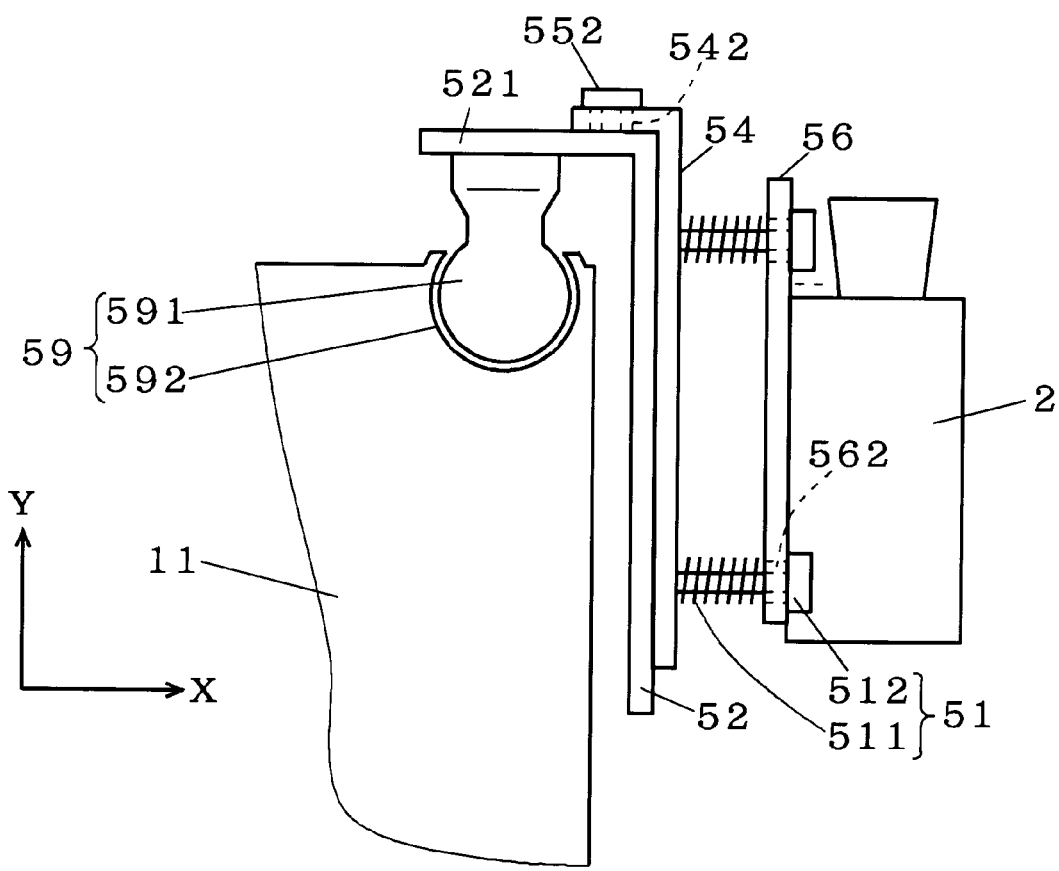
FIG. 9 is a sectional view showing the angle-of-view correcting mechanism of the projection-type display device of the fifth preferred embodiment of the present invention.

FIG. 9 shows a section of the angle-of-view correcting mechanism 5 of FIG. 8 as seen from the lateral (right-left) direction Z. In FIG. 9, the reference numeral 59 shows a link ball mechanism having its one end connected to the cabinet 11 and the other end connected to the protruding part 521, 591 denotes a link ball member having its one end connected to the bottom surface of the cabinet 11 and the other end connected to the protruding part 521, 592 denotes a link ball receiver formed in the cabinet 11 for receiving the one end of the cabinet 11, and the other numerals correspond to those in FIG. 3. The link ball member 591 and the link ball receiver 592 form the link ball mechanism 59, and the link ball mechanism 59 is included in the coupling portion.

The link ball member 591 is fitted in the link ball receiver 592. The cabinet 11 and the link ball member 591 produce appropriate friction in the link ball receiver 592. The link ball member 591 is thus fixed on the cabinet 11 with appropriate strength. The protruding part 521 can freely move on the one end of the link ball member 591 connected to the link ball receiver 592. This allows the projection unit 2 to rotate as seen from the vertical direction Y, to move in the depth direction X, or to incline as seen from the lateral direction Z.

Moreover, as has been described in the second preferred embodiment, adjusting the lengths of the three forward-and-backward expanding/retracting members 51 can cause the projection unit 2 to somewhat rotate as seen from the vertical direction Y, to move in the depth direction X, or to incline as seen from the lateral direction Z. Also, the vertical screws 552 allow the projection unit 2 to be moved in the lateral direction Z.

As described above, the link ball mechanism 59 supports the moving plates in a position-adjustable manner with the linking force of the link ball.

The fifth preferred embodiment provides the following effects. That is to say, the angle-of-view correcting mechanism 5 having only two moving plates can be sized shorter in the depth (front-back) direction X than the conventional angle-of-view correcting mechanism 50. This allows the cabinet 11 to be sized shorter in the depth direction X.

Further, in the fifth preferred embodiment, the absence of the moving plate 54 allows the projection unit 2 to be located in a still lower part in the cabinet 11 than in the second preferred embodiment. This further downsizes the projection-type display devices 100 in the depth direction X.

Moreover, the angle-of-view correcting mechanism 5 having fewer parts, or fewer moving plates, than the conventional angle-of-view correcting mechanism 50 can be produced at lower cost. The structure of the fifth preferred embodiment in which the protruding part 521 is supported at a point on the cabinet 11 is much simpler than those in the second to fourth preferred embodiments.

Moreover, the angle-of-view correcting mechanism 5 can produce rotation as seen from the vertical direction Y, inclination as seen from the depth direction X, inclination as seen from the lateral direction Z, movement in the depth direction X, and movement in the lateral direction Z. Hence the angle-of-view correcting mechanism 5 can correct five kinds of the deviations described in the background art, i.e., vertical deviation, lateral deviation, inclination, vertical trapezoidal distortion, and transverse trapezoidal distortion, and combinations thereof.

Further, since the multi-projector is formed of projection-type display devices placed on top of each other in vertical and lateral directions, the cover 112 for allowing the interior to be seen can be provided only in the rear of the projection-type display device 100 as shown in FIG. 2. When the cover 112 is opened and the interior is seen, the tops of the front-to-back screws 512 are seen in the front. Accordingly, the front-to-back screws 512 can be easily rotated with a screwdriver. Also, the projection unit 2 can be easily moved on the one end of the link ball member 591 connected to the link ball receiver 592 by holding the moving plate 52 by hand.

Modifications

Although the forward-and-backward expanding/retracting members 51 have been explained as structure each formed of the front-to-back coiled spring 511 and the front-to-back screw 512, other expandable and retractable structures may be used.

Although the first to fifth preferred embodiments have described projection-type display devices applied to multi-projectors, the invention may be applied to projection-type display devices used by themselves.

The present invention is especially effective for projection-type display devices having projection units 2 containing such devices as cannot electrically correct the optical path, as liquid-crystal devices or DMDs, since they require angle-of-view correcting mechanisms.

The present invention provides a short-sized projection-type display device, which is suitable for installation of a large-screen video device in a limited space, as in a supervisory control room, a showroom, etc.

While the invention has been described in detail, the foregoing description is in all aspects illustrative and not restrictive. It is understood that numerous other modifications and variations can be devised without departing from the scope of the invention.

I claim:

1. A projection-type display device, comprising:

a cabinet;

a screen having a screen surface and provided in a front surface of said cabinet;

a projection unit for projecting an image to be displayed on a screen in a first direction generally parallel to the screen surface;

a mirror for redirecting the image projection from the first direction to a second direction generally normal to the screen surface; and said cabinet having a bottom surface extending generally transversely with respect to said first direction; and a projection unit alignment correcting mechanism supporting said projection unit not on the bottom surface of said cabinet but on a side surface of said cabinet generally orthogonal to said bottom surface, said projection unit alignment correcting mechanism enabling movement of said projection unit relative to said screen and said mirror to correct at least angle of projection of said image projected on said screen from said projection unit, thereby positioning the image to be displayed in a desired position and orientation on said screen.

2. The projection-type display device according to claim 1, wherein said projection unit alignment correcting mechanism comprises, a body of said mechanism including a side surface facing said side surface of said projection unit, and an upper surface, and a direction setting portion provided on said side surface and said upper surface, for setting direction of said projection unit to correct said angle of view.

3. The projection-type display device according to claim 2, wherein said body of said mechanism comprises at least one moving plate, and said direction setting portion comprises a coupling portion for coupling said at least one moving plate to said cabinet in a position-adjustable manner.

4. The projection-type display device according to claim 3, wherein said coupling portion comprises a pinch mechanism which pinches and holds said at least one moving plate to said cabinet in a position-adjustable manner, said coupling portion including a resilient bias element having an energizing force for biasing said moving plate in the desired position.

5. The projection-type display device according to claim 3, wherein said coupling portion comprises a wedge mechanism which interacts with and holds said at least one moving plate in a position-adjustable manner.

6. The projection-type display device according to claim 3, wherein said coupling portion comprises a link ball mechanism which supports said at least one moving plate in a position-adjustable manner.

* * * * *